(12) United States Patent
Xu et al.

(10) Patent No.: US 10,694,389 B2
(45) Date of Patent: Jun. 23, 2020

(54) NETWORK SLICE MANAGEMENT METHOD, MANAGEMENT UNIT, AND SYSTEM

(71) Applicant: Huawei Technologies Co., Ltd., Shenzhen (CN)

(72) Inventors: Ruiyue Xu, Shanghai (CN); Lan Zou, Shanghai (CN); Yan Zhou, Shanghai (CN); Yan Li, Shanghai (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/399,426

(22) Filed: Apr. 30, 2019

(65) Prior Publication Data

US 2019/0261186 A1    Aug. 22, 2019

Related U.S. Application Data

(63) Continuation of application No. PCT/CN2016/113867, filed on Dec. 30, 2016.

(30) Foreign Application Priority Data

Oct. 31, 2016    (WO) ................ PCT/CN2016/104159

(51) Int. Cl.
*H04W 72/00*    (2009.01)
*H04W 16/10*    (2009.01)
(Continued)

(52) U.S. Cl.
CPC ........... *H04W 16/10* (2013.01); *H04W 24/02* (2013.01); *H04W 28/24* (2013.01)

(58) Field of Classification Search
CPC ............................. H04W 16/10; H04W 28/24
(Continued)

(56) References Cited

U.S. PATENT DOCUMENTS 10,117,137 B2 * 10/2018 Rommer ............... H04W 48/18
2010/0161916 A1 * 6/2010 Thornton ............ G06F 11/1076
                                                        711/154
(Continued)

FOREIGN PATENT DOCUMENTS

CN    103650437 A    3/2014
CN    103905523 A    7/2014
(Continued)

OTHER PUBLICATIONS

Machine Translation and Abstract of Chinese Publication No. CN103650437, Mar. 19, 2014, 63 pages.
(Continued)

*Primary Examiner* — Marceau Milord
(74) *Attorney, Agent, or Firm* — Conley Rose, P.C.

(57) ABSTRACT

A network slice management method, a management unit, and a system, where the method includes receiving, by a first management unit, a first management request, where the first management request carries requirement information of a network slice or indication information, and the indication information is used to obtain the requirement information of the network slice. The method further includes determining, by the first management unit, requirement information of a subnet that forms the network slice. According to the method, the first management unit can determine the corresponding requirement information of the subnet based on the requirement information of the network slice.

18 Claims, 7 Drawing Sheets

(51) Int. Cl.
*H04W 28/24* (2009.01)
*H04W 24/02* (2009.01)

(58) Field of Classification Search
USPC .................................. 455/452.1, 414.1, 450
See application file for complete search history.

(56) References Cited

U.S. PATENT DOCUMENTS

| | | | |
|---|---|---|---|
| 2012/0233302 A1 | 9/2012 | Kallin et al. | |
| 2013/0007232 A1* | 1/2013 | Wang | H04L 63/0272 709/222 |
| 2013/0208792 A1* | 8/2013 | He | H04N 19/105 375/240.12 |
| 2014/0086177 A1* | 3/2014 | Adjakple | H04W 12/08 370/329 |
| 2014/0269295 A1 | 9/2014 | Anumala | |
| 2014/0280864 A1 | 9/2014 | Yin et al. | |
| 2015/0180736 A1 | 6/2015 | Leung | |
| 2015/0281073 A1* | 10/2015 | Kotha | H04L 45/745 370/392 |
| 2015/0358399 A1 | 12/2015 | Baugher et al. | |
| 2016/0142246 A1 | 5/2016 | Wang et al. | |
| 2016/0255535 A1* | 9/2016 | De Foy | H04L 67/2804 370/236 |
| 2016/0353465 A1* | 12/2016 | Vrzic | H04W 12/06 |
| 2017/0180213 A1 | 6/2017 | Li et al. | |
| 2017/0208011 A1* | 7/2017 | Bosch | H04L 47/25 |
| 2017/0237656 A1* | 8/2017 | Gage | H04L 45/74 370/392 |
| 2017/0245316 A1* | 8/2017 | Salkintzis | H04W 76/27 |
| 2017/0289791 A1* | 10/2017 | Yoo | H04W 76/11 |
| 2018/0103368 A1* | 4/2018 | Son | H04W 8/08 |
| 2018/0139660 A1* | 5/2018 | Rommer | H04W 48/18 |
| 2018/0247244 A1 | 8/2018 | Wang | |
| 2018/0324187 A1* | 11/2018 | Heintel | H04L 63/08 |
| 2018/0368056 A1* | 12/2018 | Wang | H04W 76/12 |
| 2019/0158653 A1* | 5/2019 | Sonntag | G06F 21/121 |
| 2019/0230725 A1* | 7/2019 | Lou | H04W 68/005 |

FOREIGN PATENT DOCUMENTS

| | | |
|---|---|---|
| CN | 103997513 A | 8/2014 |
| CN | 104243196 A | 12/2014 |
| CN | 104639653 A | 5/2015 |
| CN | 104917809 A | 9/2015 |
| CN | 105281955 A | 1/2016 |
| CN | 105391568 A | 3/2016 |
| CN | 105812217 A | 7/2016 |
| CN | 105813195 A | 7/2016 |
| WO | 2013110742 A1 | 8/2013 |

OTHER PUBLICATIONS

Machine Translation and Abstract of Chinese Publication No. CN103997513, Aug. 20, 2014, 20 pages.
Machine Translation and Abstract of Chinese Publication No. CN104917809, Sep. 16, 2015, 13 pages.
Machine Translation and Abstract of Chinese Publication No. CN105812217, Jul. 27, 2016, 16 pages.
Machine Translation and Abstract of Chinese Publication No. CN105813195, Jul. 27, 2016, 24 pages.
"3rd Generation Partnership Project; Technical Specification Group Services and System Aspects; Feasibility Study on New Services and Markets Technology Enablers; Stage 1 (Release 14)," 3GPP TR 22.891, V14.2.0, Sep. 2016, 95 pages.
"3rd Generation Partnership Project; Technical Specification Group Services and System Aspects; Study on Architecture for Next Generation System (Release 14)," 3GPP TR 23.799, V1.0.2, Sep. 2016, 423 pages.
Foreign Communication From a Counterpart Application, PCT Application No. PCT/CN2016/104159, International Search Report dated Jul. 6, 2017, 7 pags.
Foreign Communication From a Counterpart Application, PCT Application No. PCT/CN2016/104159, Written Opinion dated Jul. 6, 2017, 4 pages.
Foreign Communication From a Counterpart Application, PCT Application No. PCT/CN2016/113867, English Translation of International Search Report dated May 3, 2017, 2 pages.
Foreign Communication From a Counterpart Application, PCT Application No. PCT/CN2016/113867, English Translation of Written Opinion dated May 3, 2017, 3 pages.
Foreign Communication From a Counterpart Application, European Application No. 16919894.2, Extended European Search Report dated Sep. 25, 2019, 11 pages.

* cited by examiner

NETWORK SLICE MANAGEMENT METHOD, MANAGEMENT UNIT, AND SYSTEM

CROSS-REFERENCE TO RELATED APPLICATIONS

This application is a continuation of International Patent Application No. PCT/CN2016/113867, filed on Dec. 30, 2016, which claims priority to International Patent Application No. PCT/CN2016/104159, filed on Oct. 31, 2016. The disclosures of the aforementioned applications are hereby incorporated by reference in their entireties.

TECHNICAL FIELD

Embodiments of the present disclosure relate to the communications field, and in particular, to a network slice management method, a management unit, and a system.

BACKGROUND

With continuous growth of network requirements, a telecommunications operator needs to provide more technologies to cooperate with different customers, including sharing an infrastructure, providing a particular network function, and integrating a partner's powerful and abundant software capabilities into a next-generation network system, or the like. Network slicing is an important technical means used in the next-generation network system to meet special network requirements of different users and different industries. Network slices are communication resources to ensure that a carried service can meet Service Level Agreement (SLA) requirements. These resources may be physically or logically isolated from each other based on different requirements. It may be considered that a network slice is a combination of network functions and resources that are needed to complete a particular service or some services, and is a complete logical network. In the next-generation network system, different tenants can deploy their own services by renting the telecommunications operator's network. For example, an electric power company can deploy its meter reading service by renting the telecommunications operator's network, and the telecommunications operator splits its own network into different network slices for different tenants to use.

Currently, during network slice deployment, after receiving a service request, a network management service designer needs to manually deploy a network slice to meet the service request. This way of manually deploying a network slice is inefficient.

SUMMARY

Embodiments of the present disclosure provide a network slice management method, a management unit, and a system, to resolve a problem of low network slice deployment efficiency in other approaches.

According to a first aspect of the embodiments of the present disclosure, a network slice management method is provided. The method includes receiving, by a first management unit, a first management request, where the first management request carries requirement information of a network slice or indication information, and the indication information is used to obtain the requirement information of the network slice. The method further includes determining, by the first management unit, requirement information of a subnet that forms the network slice.

The first management request is used to instruct the first management unit to manage the network slice based on the requirement information of the network slice. The requirement information of the subnet is used to manage the subnet. The network slice includes at least one subnet. The subnet may alternatively be a subnet slice.

In this method, after receiving the first management request that carries the requirement information of the network slice or the indication information, the first management unit can determine a corresponding subnet requirement based on the requirement information of the network slice, where the subnet requirement may be a requirement of a plurality of subnets. The first management unit sends the subnet requirement to a management unit of a corresponding subnet, and the management unit of the corresponding subnet determines a network resource instance that can satisfy the requirement information of the network slice, in order to implement automatic network slice deployment based on the requirement information of the network slice, thereby greatly improving network slice deployment efficiency.

The method is described from a perspective of the first management unit. The first management unit may be an entity having a network slice management function, such as an end-to-end manager and orchestrator unit.

In a possible design, after receiving the first management request, the first management unit further allocates a network slice identifier to the network slice. The network slice identifier may be an identifier of a network slice instance.

In a possible design, after determining the requirement information of the subnet, a first unit may further send a second management request to a second management unit, where the second management request carries the requirement information of the subnet. The second management request is used to instruct the second management unit to manage the subnet based on the requirement information of the subnet.

In a possible design, if the first management unit has allocated the network slice identifier, the network slice identifier may also be carried in the second management request.

In a possible design, after receiving the second management request from the first management unit, the second management unit may further allocate an identifier of the subnet to the subnet. Further, the second management unit may further send the identifier of the subnet to the first management unit.

In such a design, after receiving the identifier of the subnet from the second management unit, the first management unit may further associate the identifier of the subnet with the network slice identifier.

In a possible design, after the second management unit receives the second management request from the first management unit, if a subnet instance that satisfies the requirement information of the subnet already exists in an existing network, the second management unit may directly select the subnet instance that satisfies the requirement information of the subnet from the existing network. Further, the second management unit may further send an identifier of the subnet instance to the first management unit.

In such a design, after receiving the identifier of the subnet from the second management unit, the first management unit may further associate the identifier of the subnet instance with the network slice identifier.

In a possible design, if a subnet instance that satisfies the requirement information of the subnet already exists in an existing network, the first management unit may directly select the subnet instance that satisfies the requirement information of the subnet from the existing network. Further, the first management unit may associate an identifier of the subnet instance with the network slice identifier.

In a possible design, if the first management request received by the first management unit carries the indication information, the first management unit may first obtain a network slice descriptor based on the indication information, and then obtain the requirement information of the network slice based on the network slice descriptor. The network slice descriptor may be a network slice template or the like.

In a possible design, when determining the requirement information of the subnet that forms the network slice, the first management unit may determine the requirement information of the subnet according to a preset rule.

According to a second aspect of the embodiments of the present disclosure, a network slice management method is provided. The method includes receiving, by a second management unit, a second management request from a first management unit, where the second management request carries requirement information of a subnet, and the second management request is used to instruct the second management unit to manage the subnet based on the requirement information of the subnet. The method further includes determining, by the second management unit, requirement information of a network resource that satisfies the requirement information of the subnet, where the requirement information of the network resource is used to select, create, configure, or activate a network resource instance that satisfies the requirement information of the network resource, and the network resource instance is used to provide the subnet.

In this method, after receiving a subnet requirement from the first management unit, the second management unit automatically determines, based on the subnet requirement, a network resource instance that can satisfy the subnet requirement, in order to implement automatic network slice deployment based on requirement information of a network slice, thereby greatly improving network slice deployment efficiency.

The method is described from a perspective of the second management unit. For example, the second management unit may be an entity, such as a core network domain orchestrator and manager unit, an access domain orchestrator and manager unit, or a transmission domain orchestrator and manager unit.

In a possible design, after receiving the second management request from the first management unit, the second management unit may further allocate an identifier of the subnet to the subnet. Further, the second management unit may further send the identifier of the subnet to the first management unit.

In such a design, after receiving the identifier of the subnet from the second management unit, the first management unit may further associate the identifier of the subnet with a network slice identifier.

In a possible design, after the second management unit receives the second management request from the first management unit, if a subnet instance that satisfies the requirement information of the subnet already exists in an existing network, the second management unit may directly select the subnet instance that satisfies the requirement information of the subnet from the existing network. Further, the second management unit may further send an identifier of the subnet instance to the first management unit.

In such a design, after receiving the identifier of the subnet from the second management unit, the first management unit may further associate the identifier of the subnet instance with a network slice identifier.

In a possible design, after determining the requirement information of the network resource that satisfies the requirement information of the subnet, the second management unit sends a third management request to a third management unit, where the third management request carries the requirement information of the network resource, and the third management request is used to request the network resource instance.

In a possible design, the second management request further carries a network slice identifier that is allocated by the first management unit to a network slice, where the network slice includes at least one subnet. Correspondingly, after the second management unit receives the second management request from the first management unit, the second management unit may further determine that the network slice identifier is a subnet identifier, where the subnet identifier is an identifier of the subnet; or the second management unit may further allocate a subnet identifier to the subnet, and associate the subnet identifier with the network slice identifier, where the subnet identifier is an identifier of the subnet or an identifier of a subnet instance.

In a possible design, if a network resource instance that satisfies the requirement information of the network resource exists in an existing network, after determining the requirement information of the network resource, the second management unit may directly select the network resource instance that satisfies the requirement information of the network resource from the existing network.

In a possible design, when the second management unit determines the requirement information of the network resource, the second management unit may determine a subnet descriptor that includes the requirement information of the subnet, and then determine, based on the subnet descriptor, requirement information of a network resource that satisfies the requirement information of the subnet. Alternatively, the second management unit may determine, according to a preset rule, requirement information of a network resource that satisfies the requirement information of the subnet.

According to a third aspect of the embodiments of the present disclosure, a network slice management method is provided. The method includes receiving, by a third management unit, a third management request from a second management unit, where the third management request carries requirement information of a network resource, and the third management request is used to request a network resource instance that satisfies the requirement information of the network resource. The method then includes selecting, deploying, configuring, or activating, by the third management unit, the network resource instance.

In the method, after receiving the third management request that is sent by the second management unit and that carries the requirement information of the network resource, the third management unit automatically selects, deploys, configures, or activates the network resource instance based on a network resource requirement, in order to implement automatic network slice deployment based on requirement information of a network slice, thereby greatly improving network slice deployment efficiency.

The method is described from a perspective of the third management unit. For example, the third management unit may be an entity, such as a network function controller unit of a core network, a network function controller unit of an access network, or a network manager and controller unit of a transmission network.

In a possible design, if the requirement information of the network resource does not include instance information of the network resource, when selecting, deploying, configuring, or activating the network resource instance, the third management unit may first determine requirement information of the network resource instance, and then select, deploy, configure, or activate a network resource instance that satisfies the requirement information of the network resource instance.

In the network slice management methods provided in the first aspect to the third aspect, managing the subnet means creating, selecting, configuring, or activating the subnet.

The requirement information of the network slice may include at least one of the following: a type of the network slice, information about the network slice, deployment information of the network slice, a key performance indicator KPI of the network slice, a network characteristic of the network slice, user information of the network slice, or information about a service provided by the network slice.

The requirement information of the subnet may include at least one of the following: a type of the subnet, SLA information of the subnet, deployment information of the subnet, a KPI of the subnet, or a functional characteristic of the subnet.

The requirement information of the network resource may include at least one of the following: a type of the network resource, descriptor information of the network resource, instance information of the network resource, a KPI of the network resource, or a functional characteristic of the network resource.

The network resource instance may include at least one of the following: a network function, a network element, a network service, or a transmission resource.

The "subnet identifier", the "identifier of a subnet", and the "identifier of a subnet instance" are all used to represent an identifier that can uniquely identify a subnet. The three terms can be interchangeably used, and this is not limited in the embodiments of the present disclosure.

According to a fourth aspect of the embodiments of the present disclosure, a first management unit is provided, where the first management unit has functions for implementing behavior of the first management unit in the foregoing method examples. The functions may be implemented by hardware, or may be implemented by hardware executing corresponding software. The hardware or software includes one or more modules that correspond to the foregoing functions.

In a possible design, the first management unit includes a processor, and the processor is configured to provide support for the first management unit to perform corresponding functions in the foregoing methods. Further, the first management unit may further include a communications interface, and the communications interface is configured to support communication between the first management unit and a second management unit or communication between the first management unit and another unit. Further, the first management unit may further include a memory, and the memory is configured to couple to the processor and store data and a program instruction that are necessary for the first management unit.

According to a fifth aspect of the embodiments of the present disclosure, a second management unit is provided, where the second management unit has functions for implementing behavior of the second management unit in the foregoing method examples. The functions may be implemented by hardware, or may be implemented by hardware executing corresponding software. The hardware or software includes one or more modules that correspond to the foregoing functions.

In a possible design, the second management unit includes a processor, and the processor is configured to provide support for the second management unit to perform corresponding functions in the foregoing methods. Further, the second management unit may further include a communications interface, and the communications interface is configured to support communication between the second management unit and a first management unit, or communication between the second management unit and a third management unit, or communication between the second management unit and another unit. Further, the second management unit may further include a memory, and the memory is configured to couple to the processor and store data and a program instruction that are necessary for the second management unit.

According to a sixth aspect of the embodiments of the present disclosure, a third management unit is provided, where the third management unit has functions for implementing behavior of the third management unit in the foregoing method examples. The functions may be implemented by hardware, or may be implemented by hardware executing corresponding software. The hardware or software includes one or more modules that correspond to the foregoing functions.

In a possible design, the third management unit includes a processor, and the processor is configured to provide support for the third management unit to perform corresponding functions in the foregoing methods. Further, the third management unit may further include a communications interface, and the communications interface is configured to support communication between the third management unit and a second management unit or communication between the third management unit and another unit. Further, the third management unit may further include a memory, and the memory is configured to couple to the processor and store data and a program instruction that are necessary for the third management unit.

According to a seventh aspect of the embodiments of the present disclosure, a communications system is provided. The system includes the first management unit according to the foregoing aspects; or the system includes the first management unit and the second management unit according to the foregoing aspects; or the system includes the first management unit, the second management unit, and the third management unit according to the foregoing aspects.

According to an eighth aspect of the embodiments of the present disclosure, a computer storage medium is provided, and configured to store a computer software instruction used by the foregoing first management unit, where the computer software instruction includes a program designed to execute the foregoing aspects.

According to a ninth aspect of the embodiments of the present disclosure, a computer storage medium is provided. The computer storage medium is configured to store a computer software instruction used by the foregoing second management unit, where the computer software instruction includes a program designed to execute the foregoing aspects.

According to a tenth aspect of the embodiments of the present disclosure, a computer storage medium is provided. The computer storage medium is configured to store a computer software instruction used by the foregoing third management unit, where the computer software instruction includes a program designed to execute the foregoing aspects.

Compared with other approaches, in the solutions of the embodiments of the present disclosure, after receiving the first management request that carries the requirement information of the network slice or the indication information, the first management unit can determine the requirement information of the subnet that forms the network slice, in order to implement automatic network slice deployment based on the requirement information of the network slice, thereby improving network slice deployment efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following describes the technical solutions of the embodiments of the present disclosure with reference to the accompanying drawings in the embodiments of the present disclosure.

A network architecture and a service scenario described in the embodiments of the present disclosure are intended to describe the technical solutions in the embodiments of the present disclosure more clearly, but do not constitute any limitation on the technical solutions provided in the embodiments of the present disclosure. A person of ordinary skill in the art may learn that, with network architecture evolution and emergence of new service scenarios, the technical solutions provided in the embodiments of the present disclosure are also applicable to similar technical problems.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
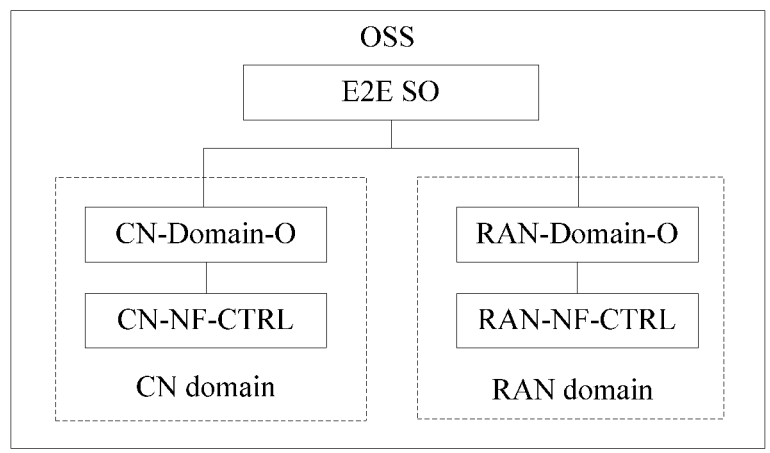
FIG. 1 is a possible system architectural diagram according to an embodiment of the present disclosure.

The following first describes a possible network architecture according to embodiments of the present disclosure with reference to FIG. 1.

FIG. 1 is a system architectural diagram of a network slice management method according to an embodiment of the present disclosure. As shown in FIG. 1, a system corresponding to the method relates to an operations support system and a communications network, and includes the following.

(1) Operations Support System (OSS)

(2) End-to-end Orchestrator (E2E-O) unit. The E2E-O unit may alternatively be referred to as an end-to-end manager unit or an end-to-end orchestrator and manager unit, and may have some or all of the functions set forth below.

End-to-end network slice management (for example, network slice lifecycle management, network slice template management, network slice fault management, network slice performance management, and network slice configuration management). End-to-end service management (for example, service lifecycle management, service template management, service fault management, service performance management, and service configuration management). End-to-end mapping of network slices, subnet slices, and network functions; coordination of network resources provided by different subdomains (for example, an access network domain, a core network domain, and a transmission domain). Unified orchestration of subnet slices and network functions provided by different subdomains, such that the subnet slices or network functions provided by different subdomains can satisfy a requirement of a target service (for example, an SLA requirement, a key performance indicator (KPI) requirement, or a quality of service (QoS) requirement). For ease of description, the E2E-O unit in the following description may alternatively be represented by E2E-O.

The E2E-O unit may include an end-to-end service orchestrator (E2E-SO) unit and an end-to-end network orchestrator (E2E-NO) unit, or may only include either an E2E-SO unit or an E2E NO unit. For ease of description, in the following description, the E2E-SO unit may alternatively be represented by E2E-SO, and the E2E-NO unit may alternatively be represented by E2E-NO.

It should be noted that the functions of the E2E-O may alternatively be completed by an entity, such as a cross-domain orchestrator (CD-O) unit, a service orchestrator (SO) unit, a network orchestrator (NO) unit, or a network manager (NM) unit. In the embodiments of the present disclosure, all the following descriptions are made using the E2E-O as an example. However, it should be understood that this should not be construed as any limitation on the embodiments of the present disclosure.

(3) Core Network Domain Orchestrator (CN-Domain-O) unit. The CN-Domain-O unit may alternatively be referred to as a core network domain manager and orchestrator unit, and may have some or all of the functions set forth below.

Management of network slices within the core network domain (including network slice lifecycle management (creation, updating, and deletion), network slice fault management, network slice performance management, network slice configuration management, or the like). Management of services within the core network domain (including service lifecycle management, service fault management, service performance management, service configuration management, or the like). Coordination of network resources within the core network domain, for unified orchestration. For ease of description, the CN-Domain-O unit in the following description may alternatively be represented by CN-Domain-O.

The CN-Domain-O may include a core network domain service orchestrator (CN-Domain-SO) unit and a core network domain network orchestrator (CN-Domain-NO) unit, or may only include either a CN-Domain-SO unit or a CN-Domain-NO unit. For ease of description, in the following description, the CN-Domain-SO unit may alternatively be represented by CN-Domain-SO, and the CN-Domain-NO unit may alternatively be represented by CN-Domain-NO.

It should be noted that, the functions of the CN-Domain-O may be completed by an entity, such as an SO unit, an NO unit, an NM, a network controller unit, or a network function virtualization and orchestrator unit. In the embodiments of the present disclosure, all the following descriptions are made using the CN-Domain-O as an example. However, it should be understood that this should not be construed as any limitation on the embodiments of the present disclosure.

(4) Radio Access Network (RAN) Domain Orchestrator (RAN-Domain-O) unit. The RAN-Domain-O unit may alternatively be referred to as a radio access network domain orchestrator and manager unit and may have some or all of the functions set forth below.

Management of network slices within the access network domain (including network slice lifecycle management (creation, updating, and deletion), network slice fault management, network slice performance management, network slice configuration management, or the like). Management of services within the access network domain (including service lifecycle management, service fault management, service performance management, service configuration management, or the like). Coordination of network resources within the access network domain, for unified orchestration. For ease of description, the RAN-Domain-O unit in the following description may alternatively be represented by RAN-Domain-O.

The RAN-Domain-O may include a Radio Access Network Domain Service Orchestrator (RAN-Domain-SO) unit and a Radio Access Network Domain Network Orchestrator (RAN-Domain-NO) unit, or may only include either an RAN-Domain-SO unit or an RAN-Domain-NO unit. For ease of description, in the following description, the RAN-Domain-SO unit may alternatively be represented by RAN-Domain-SO, and the RAN-Domain-NO unit may alternatively be represented by RAN-Domain-NO.

It should be noted that, the functions of the RAN-Domain-O may be completed by an entity, such as an SO unit, an NO unit, an NM, a network controller unit, or a network function virtualization and orchestrator unit. In the embodiments of the present disclosure, all the following descriptions are made using the RAN-Domain-O as an example. However, it should be understood that this should not be construed as any limitation on the embodiments of the present disclosure.

(5) Core Network (CN) Function Controller (CN-NF-CTRL) unit. The CN-NF-CTRL unit includes a network function manager (NF-M) unit and/or a virtualized network function manager (VNFM) unit in the core network domain, and is configured to perform lifecycle management, configuration management, fault management, performance management, or the like for network functions in the core network domain.

(6) Radio Access Network (RAN) Network Function (NF) Controller (RAN-NF-CTRL) unit. The RAN-NF-CTRL) unit includes an NF-M unit and/or a VNFM unit in the access network domain, and is configured to perform lifecycle management, configuration management, fault management, performance management, or the like for network functions in the access network domain.

A deployment relationship between the OSS and each of the E2E-O, the CN-Domain-O, and the RAN-Domain-O may be any one of the following cases. The E2E-O is located in the OSS, but the CN-Domain-O and the RAN-Domain-O are not located in the OSS; or none of the E2E-O, the CN-Domain-O, and the RAN-Domain-O are located in the OSS; or all of the E2E-O, the CN-Domain-O, and the RAN-Domain-O are located in the OSS.

Further, the CN-NF-CTRL and the RAN-NF-CTRL may be located in the OSS, or may not be located in the OSS.

The following descriptions of the embodiments of the present disclosure are all made using the foregoing system architecture as an example. However, it should be noted that the methods in the embodiments of the present disclosure may also be applied to one or more other systems.

In an existing solution, during network slice deployment, after receiving a service request, a network management service designer needs to manually break down the service request, turn the service request into a network resource request, and send the network resource request to a network designer of a core network and a network designer of a radio access network separately. The network designer of the core network and the network designer of the radio access network separately deploy network devices, and then corresponding network devices are managed using a network element management unit. This way of manually deploying a network slice is inefficient. Therefore, the embodiments of the present disclosure provide the following network slice management methods, and management units and systems based on the methods, to implement automatic network slice deployment, thereby improving network slice deployment efficiency.

Figure 2:
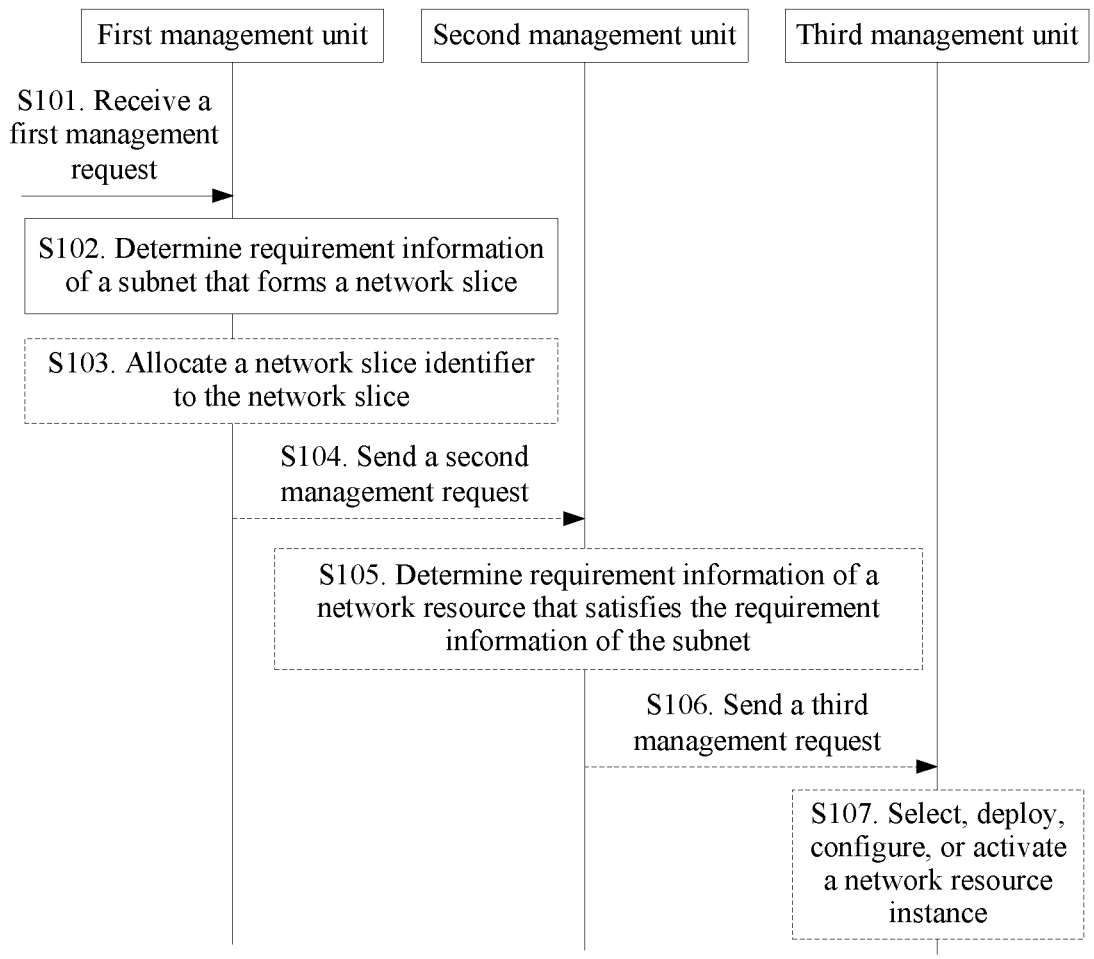
FIG. 2 is a schematic communication diagram of a network slice management method according to an embodiment of the present disclosure.
Figure 3:
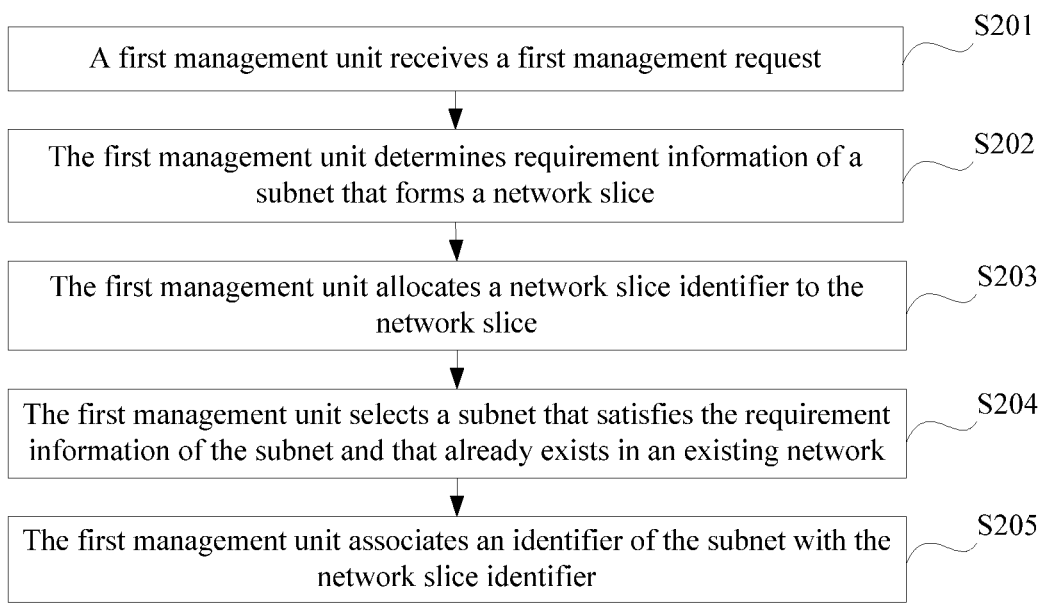
FIG. 3 is a schematic flowchart of another network slice management method according to an embodiment of the present disclosure.
Figure 4:
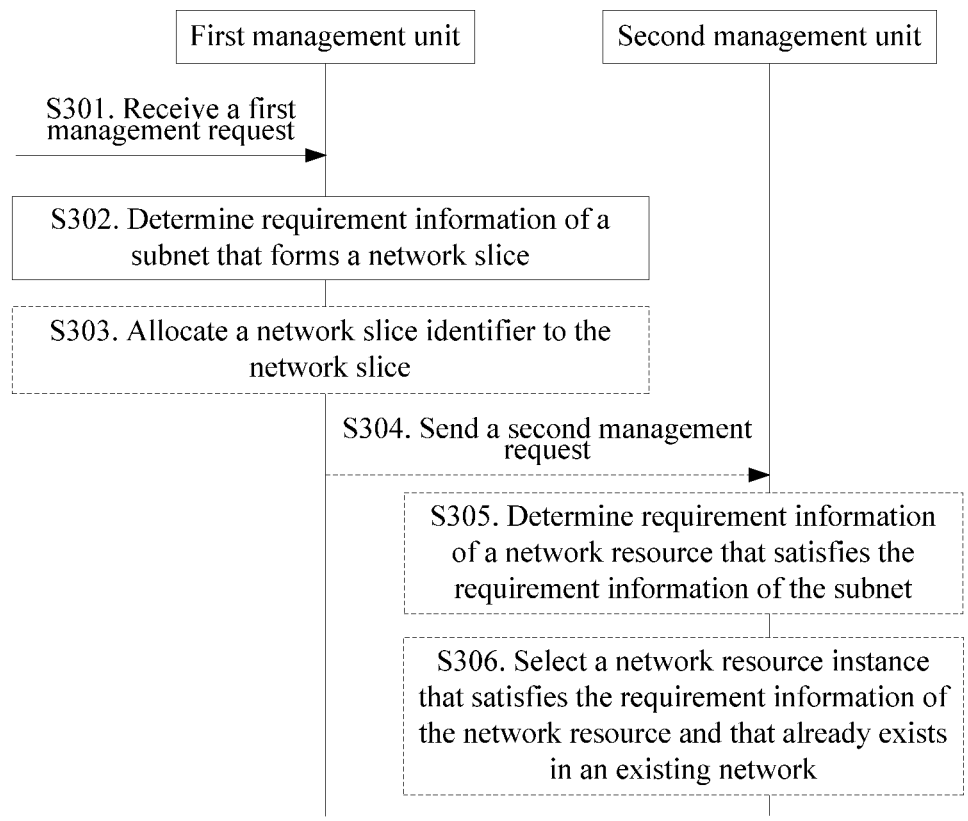
FIG. 4 is a schematic communication diagram of still another network slice management method according to an embodiment of the present disclosure.

With reference to FIG. 2 to FIG. 4, the following describes solutions provided in embodiments of the present disclosure.

FIG. 2 is a schematic communication diagram of a network slice management method according to an embodiment of the present disclosure. As shown in FIG. 2, the method includes steps S101 and S102.

S101. A first management unit receives a first management request, where the first management request carries requirement information of a network slice or indication information, and the indication information is used to obtain the requirement information of the network slice.

The first management request is used to instruct the first management unit to manage the network slice based on the requirement information of the network slice.

The first management unit may be an E2E-O.

In some embodiments, when network slice management is needed, a user may send the first management request to the first management unit using an operable interface or the like provided by a system, or a base station subsystem (BSS) sends the first management request to the first management unit, where the first management request may carry the requirement information of the network slice or the indication information, and the first management request is used to instruct the first management unit to manage the network slice based on the requirement information of the network slice. The management of the network slice may be, for example, lifecycle management of the network slice, template management of the network slice, fault management of the network slice, performance management of the network slice, or configuration management of the network slice. The lifecycle management of the network slice may include instantiation of the network slice, creation of the network slice, modification of the network slice, updating of the network slice, or the like.

In an example, the requirement information of the network slice may include at least one of the following: a type of the network slice, SLA information of the network slice, deployment information of the network slice, a KPI of the network slice, a network characteristic of the network slice, user information of the network slice, or information about a service provided by the network slice.

The SLA information may include at least one of the following: a latency, a success rate, bandwidth, coverage, a traffic model, or the like. The KPI may include a maximum latency and/or maximum bandwidth, or the like.

When the first management request carries the requirement information of the network slice, the first management unit may directly perform a subsequent operation based on the requirement information.

When the first management request does not directly carry the requirement information of the network slice but carries the indication information, the first management unit may obtain the corresponding requirement information of the network slice using the following process. First, the first management unit obtains a network slice descriptor based on the indication information of the network slice. Then, the first management unit obtains the requirement information of the network slice based on the network slice descriptor.

Optionally, the indication information of the network slice may be an identifier used to identify the network slice descriptor, such as a name of the network slice descriptor, a type of the network slice descriptor, or a characteristic of the network slice descriptor, and the network slice descriptor may be a network slice template, a network slice blueprint, or the like. After receiving the indication information, the first management unit may obtain the corresponding network slice descriptor based on the indication information, i.e., based on information such as the name, type, or characteristic of the network slice descriptor. The network slice descriptor includes the requirement information of the network slice. Therefore, the first management unit can obtain the requirement information of the network slice based on the network slice descriptor.

S102. The first management unit determines requirement information of a subnet that forms the network slice, where the requirement information of the subnet is used to manage the subnet, and the network slice includes at least one subnet.

The requirement information of the subnet that forms the network slice is used to manage the subnet that forms the network slice. The network slice may include at least one subnet.

It should be noted that the subnet may be a subnet slice. In other words, one network slice may include a subnet or may include a subnet slice. When the network slice includes a subnet slice, processing of requirement information corresponding to the subnet slice may be performed based on a process in which the requirement information of the subnet is processed.

Managing the subnet may comprise creating, selecting, configuring, or activating the subnet.

In an example, the requirement information of the subnet may include at least one of the following: a type of the subnet, SLA information of the subnet, deployment information of the subnet, a KPI of the subnet, or a functional characteristic of the subnet.

The SLA information of the subnet may include at least one of the following: a latency, a success rate, bandwidth, coverage, a traffic model, or the like. The KPI of the subnet may include: a maximum latency and/or maximum bandwidth, or the like.

In an example, when determining the requirement information of the subnet that forms the network slice, the first management unit may determine the requirement information of the subnet according to a preset rule.

For example, the first management unit may determine the requirement information of the subnet based on a preset decomposition algorithm. For example, when a ratio of a latency in a CN domain to a latency in an RAN domain is 1:2 according to the decomposition algorithm, and an SLA-required latency carried in the foregoing requirement information of the network slice is 3 milliseconds (ms), the first management unit may determine, based on the decomposition algorithm, that an SLA latency of a subnet in the CN domain is 1 ms and an SLA latency of a subnet in the RAN domain is 2 ms.

It should be noted that the requirement information of the subnet determined by the first management unit may include requirement information of a plurality of subnets. For example, the requirement information of the subnet determined by the first management unit after the first management unit receives the requirement information of the network slice may comprise: requirement information of a core network domain and requirement information of an access network domain. Then the first management unit may separately send the requirement information of the two subnets to a corresponding second management unit. The following step S104 in this embodiment of the present disclosure is described using an example in which the first management unit sends the requirement information of the subnet to a second management unit. For remaining operations on the second management unit, refer to step S104. Details are not described herein again in this embodiment of the present disclosure.

Optionally, the method shown in FIG. 2 may further include the following steps S103 to S105.

S103. The first management unit allocates a network slice identifier to the network slice.

The network slice identifier is used to uniquely identify the network slice.

It should be noted that the network slice identifier may be an identifier of a network slice instance, and the identifier is used to uniquely identify the network slice instance.

Optionally, the network slice identifier allocated by the first management unit to the network slice may include at least one of the following information: a public land mobile network (PLMN) identifier, a tenant identifier, a slice type, a service type, a slice identifier, or the like.

It should be noted that there is no execution sequence for step S103 and step S102. Step S102 may be performed before step S103; or step S103 may be performed before step S102; or step S102 and step S103 may be concurrently performed.

S104. The first management unit sends a second management request to a second management unit, where the second management request carries the requirement information of the subnet.

The second management request is used to instruct the second management unit to manage the subnet based on the requirement information of the subnet.

The second management unit may be the CN-Domain-O, the RAN-Domain-O, the CN-NF-CTRL, the RAN-NF-CTRL, or an element management system (EMS). When the second management unit is an EMS, the EMS may have functions of the CN-Domain-O, the RAN-Domain-O, the CN-NF-CTRL, or the RAN-NF-CTRL.

Further, in addition to the requirement information of the subnet, the second management request may carry the network slice identifier.

When the second management request carries the network slice identifier, the second management unit may further perform the following operations after receiving the second management request. The second management unit determines that the network slice identifier is a subnet identifier. Alternatively, the second management unit allocates a subnet identifier to the subnet, and associates the subnet identifier with the network slice identifier, where the subnet identifier is an identifier of the subnet.

S105. The second management unit determines requirement information of a network resource that satisfies the requirement information of the subnet.

After receiving the second management request from the first management unit, the second management unit determines the requirement information of the network resource that satisfies the requirement information of the subnet. The requirement information of the network resource is used to select, create, configure, or activate a network resource instance that satisfies the requirement information of the network resource. The network resource instance is used to provide the subnet.

In an example, the requirement information of the network resource may include at least one of the following: a type of the network resource, descriptor information of the network resource, instance information of the network resource, a KPI of the network resource, or a functional characteristic of the network resource.

In an example, the network resource instance may include at least one of the following: a network function, a network element, a network service, or a transmission resource.

Optionally, the second management unit may determine, in either of the following two manners, the requirement information of the network resource that satisfies the requirement information of the subnet.

Manner 1: The second management unit determines a subnet descriptor that includes the requirement information of the subnet, and determines, based on the subnet descriptor, the requirement information of the network resource that satisfies the requirement information of the subnet.

Manner 2: The second management unit determines, according to a preset rule, the requirement information of the network resource that satisfies the requirement information of the subnet.

Optionally, after step S105 is performed, the method shown in FIG. 2 may further include the following steps S106 and S107.

S106. The second management unit sends a third management request to a third management unit, where the third management request carries the requirement information of the network resource.

The third management request is used to request a network resource instance that satisfies the requirement information of the network resource.

The third management unit may be the CN-NF-CTRL, the CN-NF-Manager, the RAN-NF-CTRL, or an RAN NF Manager.

S107. The third management unit selects, deploys, configures, or activates a network resource instance.

When the requirement information of the network resource carried in the third management request does not include instance information of the network resource, the third management unit may select, deploy, configure, or activate the network resource instance using the following process. First, the third management unit determines requirement information of the network resource instance. Then, the third management unit selects, deploys, configures, or activates a network resource instance that satisfies the requirement information of the network resource instance.

Optionally, after step S104 is performed, the method shown in FIG. 2 may further include the following steps S108a, S108b, S109, and S110, where either S108a or S108b may be performed.

S108a. The second management unit allocates an identifier of the subnet to the subnet.

S108b. The second management unit uses a subnet instance that already exists in an existing network.

S109. The second management unit sends the identifier of the subnet or an identifier of the subnet instance to the first management unit.

S110. The first management unit associates the identifier of the subnet with the network slice identifier, or the first management unit associates the identifier of the subnet instance with the network slice identifier.

It should be noted that, if S108b is performed, S105 to S107 do not need to be performed; or if S108a is performed, S105 to S107 may be performed and there is no time sequence association between execution of steps S108a, S109, and S110 and execution of steps S105 to S107. In other words, steps S108a, S109, and S110 may be performed before, after, or concurrently with steps S105 to S107, and this is not limited in this embodiment of the present disclosure.

In this embodiment, after receiving the first management request that carries the requirement information of the network slice or the indication information, the first management unit can determine a corresponding subnet requirement based on the requirement information of the network slice, where the subnet requirement may be a requirement of a plurality of subnets. The first management unit sends the subnet requirement to a management unit of a corresponding subnet, and the management unit of the corresponding subnet determines a network resource instance that can satisfy the requirement information of the network slice, in order to implement automatic network slice deployment based on the requirement information of the network slice, thereby greatly improving network slice deployment efficiency.

FIG. 3 is a schematic flowchart of another network slice management method according to an embodiment of the present disclosure. In the method shown in FIG. 3, for content that is the same as or similar to content in FIG. 2, refer to the detailed description of FIG. 2. Details are not described herein again. As shown in FIG. 3, the method includes step S201 and step S202. Optionally, the method may further include steps S203 to S205.

S201. A first management unit receives a first management request, where the first management request carries requirement information of a network slice or indication information, and the indication information is used to obtain the requirement information of the network slice.

Step S201 is similar to step S101 in FIG. 1. For a detailed implementation process of step S201, refer to the detailed implementation process of step S101. Details are not described herein again.

S202. The first management unit determines requirement information of a subnet that forms the network slice, where the requirement information of the subnet is used to manage the subnet, and the network slice includes at least one subnet.

Step S202 is similar to step S102 in FIG. 1. For a detailed implementation process of step S202, refer to the detailed implementation process of step S102. Details are not described herein again.

S203. The first management unit allocates a network slice identifier to the network slice.

Step S203 is similar to step S103 in FIG. 1. For a detailed implementation process of step S203, refer to the detailed implementation process of step S103. Details are not described herein again.

It should be noted that there is no execution sequence for step S203 and step S202. Step S202 may be performed before step S203; or step S203 may be performed before step S202; or step S202 and step S203 may be concurrently performed.

S204. The first management unit selects a subnet instance that satisfies the requirement information of the subnet from an existing network.

S205. The first management unit associates an identifier of the subnet instance with the network slice identifier.

The identifier of the subnet instance may be a possible implementation of a subnet identifier.

The identifier of the subnet instance may be determined by a second management unit before current network slice management, and sent to the first management unit. In some embodiments, after receiving the requirement information of the subnet sent by the first management unit, the second management unit obtains, using a third management unit, a network resource instance that satisfies the requirement information of the subnet, where the network resource instance is used to provide the subnet. The second management unit returns an identifier of the network resource instance, namely, an identifier of the subnet, to the first management unit. When the first management unit manages the network slice based on the method shown in FIG. 2, after receiving the requirement information of the network slice, the first management unit may determine, based on a characteristic (for example, a type or a functional characteristic) of the subnet corresponding to the identifier of the subnet, whether the subnet satisfies the requirement information of the network slice. If the subnet satisfies the requirement information of the network slice, the first management unit directly selects the subnet and associates the identifier of the subnet with the allocated network slice identifier. In this embodiment, after determining the requirement information of the subnet, the first management unit directly selects, based on an actual status of the existing network, the subnet that satisfies the requirement information of the subnet, and does not need to send a request message any longer to the second management unit for determining the subnet, thereby further improving network slice deployment efficiency.

FIG. 4 is a schematic communications diagram of still another network slice management method according to an embodiment of the present disclosure. In the method shown in FIG. 4, for content that is the same as or similar to content in FIG. 2, refer to the detailed description of FIG. 2. Details are not described herein again. As shown in FIG. 4, the method includes step S301 and step S302. Optionally, the method may further include steps S303 to S306.

S301. A first management unit receives a first management request, where the first management request carries requirement information of a network slice or indication information, and the indication information is used to obtain the requirement information of the network slice.

Step S301 is similar to step S101 in FIG. 1. For a detailed implementation process of step S301, refer to the detailed implementation process of step S101. Details are not described herein again.

S302. The first management unit determines requirement information of a subnet that forms the network slice, where the requirement information of the subnet is used to manage the subnet, and the network slice includes at least one subnet.

Step S302 is similar to step S102 in FIG. 1. For a detailed implementation process of step S302, refer to the detailed implementation process of step S102. Details are not described herein again.

S303. The first management unit allocates a network slice identifier to the network slice.

Step S303 is similar to step S103 in FIG. 1. For a detailed implementation process of step S303, refer to the detailed implementation process of step S103. Details are not described herein again.

It should be noted that there is no execution sequence for step S303 and step S302. Step S302 may be performed before step S303; or step S303 may be performed before step S302; or step S302 and step S303 may be concurrently performed.

S304. The first management unit sends a second management request to a second management unit, where the second management request carries the requirement information of the subnet.

Step S304 is similar to step S104 in FIG. 1. For a detailed implementation process of step S304, refer to the detailed implementation process of step S104. Details are not described herein again.

S305. The second management unit determines requirement information of a network resource that satisfies the requirement information of the subnet.

Step S305 is similar to step S105 in FIG. 1. For a detailed implementation process of step S305, refer to the detailed implementation process of step S105. Details are not described herein again.

S306. The second management unit selects a network resource instance that satisfies the requirement information of the network resource from an existing network.

Optionally, after step S304 is performed, the method shown in FIG. 4 may further include the following steps S307a, S307b, S308, and S309, where either S307a or S307b may be performed.

S307a. The second management unit allocates an identifier of the subnet to the subnet.

S307b. The second management unit uses a subnet instance that already exists in the existing network.

S308. The second management unit sends the identifier of the subnet or an identifier of the subnet instance to the first management unit.

S309. The first management unit associates the identifier of the subnet with the network slice identifier, or the first management unit associates the identifier of the subnet instance with the network slice identifier.

It should be noted that, if S307b is performed, S305 and S306 do not need to be performed; or if S307a is performed, S305 and S306 may be performed and there is no time sequence association between execution of steps S307a, S308, and S309 and execution of steps S305 and S3. In other words, steps S307a, S308, and S309 may be performed before, after, or concurrently with steps S305 and S306, and this is not limited in this embodiment of the present disclosure.

In this embodiment, after determining the requirement information of the network resource, the second management unit directly selects, based on an actual status of the existing network, the network resource instance that satisfies the requirement information of the network resource, and does not need to send a request message any longer to a third management unit for determining the network resource instance, thereby further improving network slice deployment efficiency.

The foregoing mainly describes the solutions in the embodiments of the present disclosure from a perspective of interaction between various network elements. It may be understood that, to implement the foregoing functions, each network element, such as the first management unit, the second management unit, or the third management unit, includes a corresponding hardware structure and/or a software module for performing each function. A person skilled in the art should be easily aware that, in combination with the examples described in the embodiments disclosed in this specification, units and algorithm steps in the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, division of functional units may be performed on the first management unit, the second management unit, the third management unit, or the like according to the foregoing method examples. For example, the functional units may be divided based on the functions, or two or more functions may be integrated into one processing unit. The integrated unit may be implemented in a form of hardware, or may be implemented in a form of a software functional unit. It should be noted that the unit division in the embodiments of the present disclosure is an example and is merely logical function division, and there may be another division manner in an implementation of the present embodiments.

Figure 5:
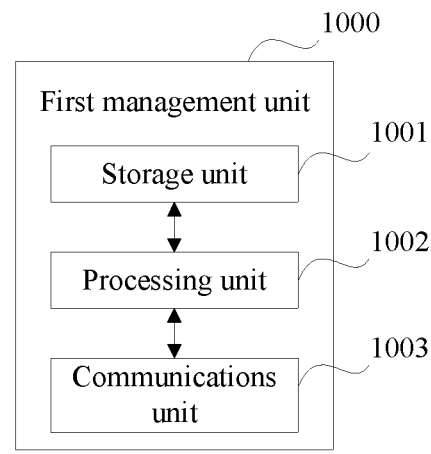
FIG. 5 is a schematic structural diagram of a first management unit according to an embodiment of the present disclosure.

FIG. 5 is a schematic diagram of a possible structure of a first management unit in the foregoing embodiments when an integrated unit is used. A first management unit 1000 includes a processing unit 1002 and a communications unit 1003. The processing unit 1002 is configured to control and manage actions of the first management unit. For example, the processing unit 1002 is configured to provide support for the first management unit to perform the processes of S110 and S101 to S104 in FIG. 2, the processes of S201 to S205 in FIG. 3, the processes of S309 and S301 to S304 in FIG. 4, and/or other processes of the technologies described in this specification. The communications unit 1003 is configured to support communication between the first management unit and another network entity, for example, communication between the first management unit and a second management unit. The first management unit may further include a storage unit 1001 configured to store program code and data of the first management unit.

The processing unit 1002 may be a processor or a controller, for example, may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications unit 1003 may be a communications interface, a transceiver, a transceiver circuit, or the like. The communications interface is a general term, and may include one or more interfaces, for example, an interface between the first management unit and the second management unit. The storage unit 1001 may be a memory.

Figure 6:
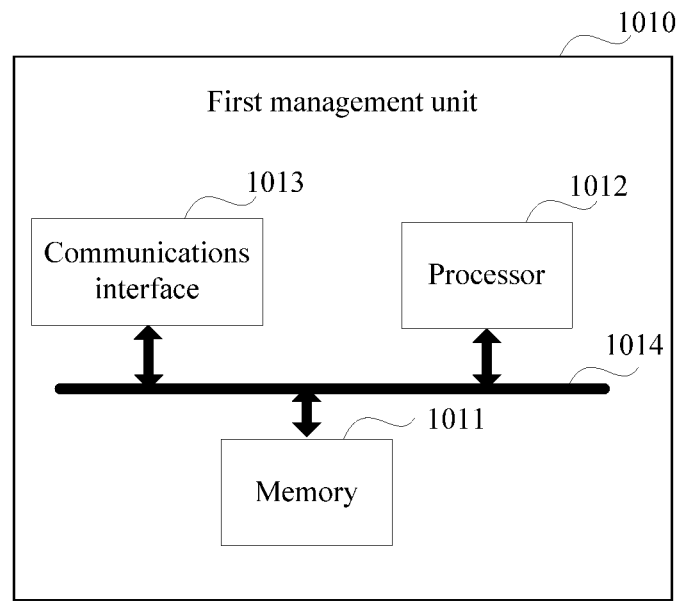
FIG. 6 is a schematic structural diagram of another first management unit according to an embodiment of the present disclosure.

When the processing unit 1002 is a processor, the communications unit 1003 is a communications interface, and the storage unit 1001 is a memory, the first management unit in this embodiment of the present disclosure may be a first management unit shown in FIG. 6.

As shown in FIG. 6, the first management unit 1010 includes a processor 1012, a communications interface 1013, and a memory 1011. Optionally, the first management unit 1010 may further include a bus 1014. The communications interface 1013, the processor 1012, and the memory 1011 may be connected to each other using the bus 1014. The bus 1014 may be a Peripheral Component Interconnect (PCI) bus, or an Extended Industry Standard Architecture (EISA) bus, or the like. The bus 1014 may be classified into an address bus, a data bus, a control bus, or the like. For ease of representation, only one thick line is used to represent the bus in FIG. 6, but this does not mean that there is only one bus or only one type of bus.

The first management unit shown in FIG. 5 or FIG. 6 may be an E2E-O, a CD-O, an SO, an NO, an NM, or the like.

Figure 7:
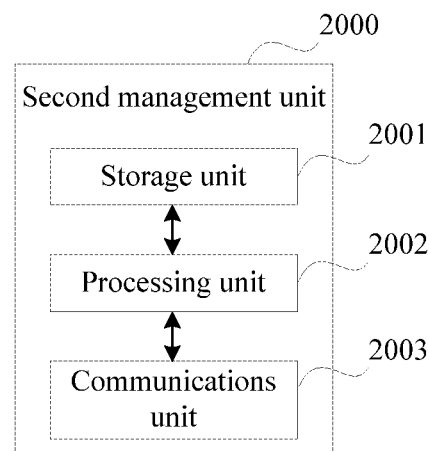
FIG. 7 is a schematic structural diagram of a second management unit according to an embodiment of the present disclosure.

FIG. 7 is a schematic diagram of a possible structure of a second management unit in the foregoing embodiments when an integrated unit is used. A second management unit 2000 includes a processing unit 2002 and a communications unit 2003. The processing unit 2002 is configured to control and manage actions of the second management unit. For example, the processing unit 2002 is configured to provide support for the second management unit to perform the processes of S105, S106, S108a, S108b, and S109 in FIG. 2, the processes of S305 and S306 to S308 in FIG. 4, and/or other processes of the technologies described in this specification. The communications unit 2003 is configured to support communication between the second management unit and another network entity, for example, communication between the second management unit and a first management unit or communication between the second management unit and a third management unit. The second management unit may further include a storage unit 2001 configured to store program code and data of the second management unit.

The processing unit 2002 may be a processor or a controller, for example, may be a CPU, a general-purpose processor, a DSP, an ASIC, an FPGA or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications unit 2003 may be a communications interface, a transceiver, a transceiver circuit, or the like. The communications interface is a general term, and may include one or more interfaces, for example, an interface between the second management unit and the first management unit, or an interface between the second management unit and the third management unit. The storage unit 2001 may be a memory.

Figure 8:
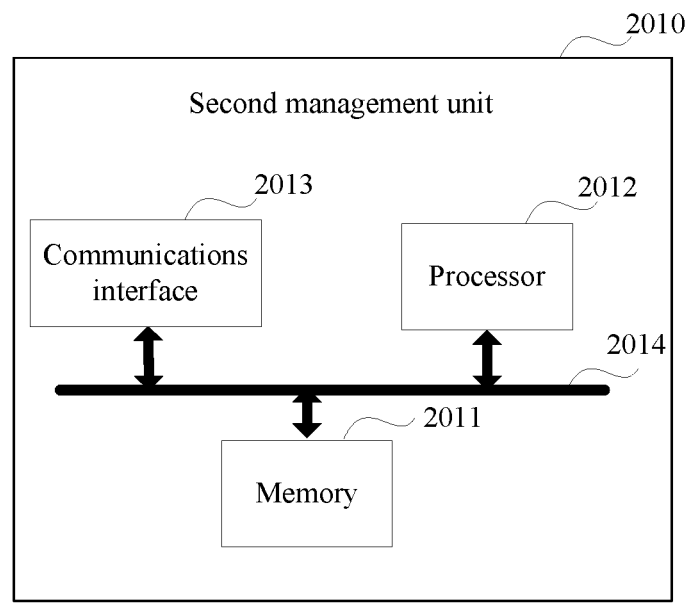
FIG. 8 is a schematic structural diagram of another second management unit according to an embodiment of the present disclosure.

When the processing unit 2002 is a processor, the communications unit 2003 is a communications interface, and the storage unit 2001 is a memory, the second management unit in this embodiment of the present disclosure may be a second management unit shown in FIG. 8.

As shown in FIG. 8, the first management unit 2010 includes a processor 2012, a communications interface 2013, and a memory 2011. Optionally, the first management unit 2010 may further include a bus 2014. The communications interface 2013, the processor 2012, and the memory 2011 may be connected to each other using the bus 2014. The bus 2014 may be a PCI bus, an EISA bus, or the like. The bus 2014 may be classified into an address bus, a data bus, a control bus, or the like. For ease of representation, only one thick line is used to represent the bus in FIG. 8, but this does not mean that there is only one bus or only one type of bus.

The second management unit shown in FIG. 7 or FIG. 8 may be a CN-Domain-O, an RAN-Domain-O, a CN-NF-CTRL, an RAN-NF-CTRL, an EMS, or the like.

Figure 9:
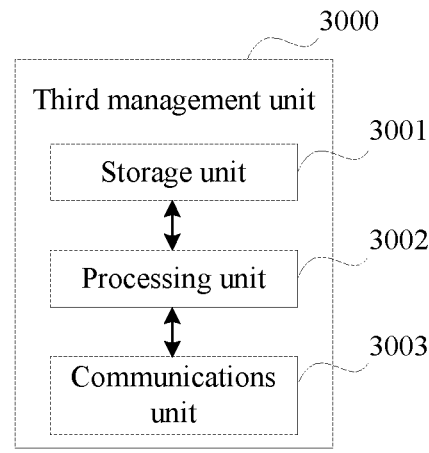
FIG. 9 is a schematic structural diagram of a third management unit according to an embodiment of the present disclosure.

FIG. 9 is a schematic diagram of a possible structure of a third management unit in the foregoing embodiments when an integrated unit is used. A third management unit 3000 includes a processing unit 3002 and a communications unit 3003. The processing unit 3002 is configured to control and manage actions of the third management unit. For example, the processing unit 3002 is configured to provide support for the third management unit to perform the process of S107 in FIG. 2, and/or other processes of the technologies described in this specification. The communications unit 3003 is configured to support communication between the third management unit and another network entity, for example, communication between the third management unit and a second management unit. The third management unit may further include a storage unit 3001 configured to store program code and data of the third management unit.

The processing unit 3002 may be a processor or a controller, for example, may be a CPU, a general-purpose processor, a DSP, an ASIC, an FPGA or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications unit 3003 may be a communications interface, a transceiver, a transceiver circuit, or the like. The communications interface is a general term, and may include one or more interfaces, for example, an interface between the third management unit and the second management unit. The storage unit 3001 may be a memory.

Figure 10:
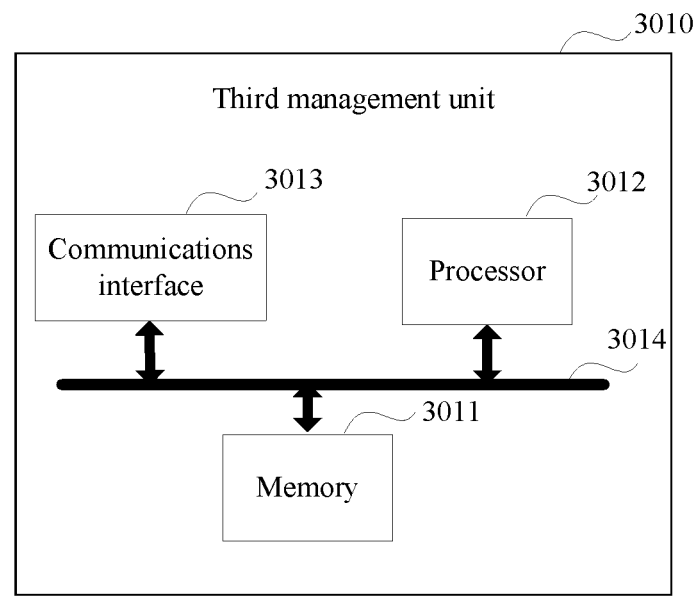
FIG. 10 is a schematic structural diagram of another third management unit according to an embodiment of the present disclosure.

When the processing unit 3002 is a processor, the communications unit 3003 is a communications interface, and the storage unit 3001 is a memory, the third management unit in this embodiment of the present disclosure may be a third management unit shown in FIG. 10.

As shown in FIG. 10, the third management unit 3010 includes a processor 3012, a communications interface 3013, and a memory 3011. Optionally, the third management unit 3010 may further include a bus 3014. The communications interface 3013, the processor 3012, and the memory 3011 may be connected to each other using the bus 3014. The bus 3014 may be a PCI bus, an EISA bus, or the like. The bus 3014 may be classified into an address bus, a data bus, a control bus, or the like. For ease of representation, only one thick line is used to represent the bus in FIG. 8, but this does not mean that there is only one bus or only one type of bus.

The second management unit shown in FIG. 9 or FIG. 10 may be a CN-NF-CTRL, a CN-NF-Manager, an RAN-NF-CTRL, an RAN NF Manager, or the like.

The steps of the methods or algorithms described in combination with the content disclosed in the embodiments of the present disclosure may be implemented by hardware, or may be implemented by a processor executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, such that the processor can read information from the storage medium or write information into the storage medium. Certainly, the storage medium may be a component of the processor. The processor and the storage medium may be located in an ASIC. In addition, the ASIC may be located in the first management unit, the second management unit, or the third management unit. Certainly, the processor and the storage medium may alternatively be located as discrete components in the first management unit, the second management unit, or the third management unit.

A person skilled in the art should be aware that in the foregoing one or more examples, functions described in the embodiments of the present disclosure may be implemented by hardware, software, firmware, or any combination thereof. When implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or special-purpose computer.

In the foregoing implementations, the objectives, technical solutions, and beneficial effects of the embodiments of the present disclosure are further described in detail. It should be understood that the foregoing descriptions are merely example implementations of the embodiments of the present disclosure, but are not intended to limit the protection scope of the embodiments of present disclosure. Any modification, equivalent replacement, improvement, or the like made based on the technical solutions of the embodiments of the present disclosure shall fall within the protection scope of the embodiments of the present disclosure.

What is claimed is:

1. A network slice management method, comprising:
receiving, by a first management entity, a first management request, wherein the first management request carries requirement information of a network slice and instructs the first management entity to manage the network slice based on the requirement information of the network slice;
determining, by the first management entity, requirement information of a subnet that forms the network slice, wherein the requirement information of the subnet is for managing the subnet, and wherein the network slice comprises at least one subnet;
sending, by the first management entity, a second management request to a second management entity, wherein the second management request carries the requirement information of the subnet and instructs the second management entity to manage the subnet based on the requirement information of the subnet; and
receiving, by the second management entity, the second management request.

2. The network slice management method according to claim 1, wherein after receiving, by the first management entity, the first management request, the method further comprises allocating, by the first management entity, a network slice identifier to the network slice.

3. The network slice management method according to claim 1, further comprising:
sending, by the second management entity, an identifier of the subnet to the first management entity; and
receiving, by the first management entity, the identifier of the subnet.

4. The network slice management method according to claim 3, further comprising associating, by the first management entity, the identifier of the subnet with a network slice identifier.

5. The network slice management method according to claim 1, wherein managing the subnet comprises creating, selecting, configuring, or activating the subnet.

6. The network slice management method according to claim 1, wherein the requirement information of the network slice comprises at least one of a type of the network slice, Service Level Agreement (SLA) information of the network slice, deployment information of the network slice, a key performance indicator (KPI) of the network slice, a network characteristic of the network slice, user information of the network slice, or information about a service provided by the network slice, and
wherein the requirement information of the subnet comprises at least one of a type of the subnet, SLA information of the subnet, deployment information of the subnet, a KPI of the subnet, or a functional characteristic of the subnet.

7. A first management entity, comprising:
a non-transitory memory comprising instructions;
a communications interface; and
at least one processor coupled to the non-transitory memory and the communications interface and configured to execute the instructions to cause the first management entity to:
receive a first management request via the communications interface, wherein the first management request carries requirement information of a network slice and instructs the first management entity to manage the network slice based on the requirement information of the network slice;
determine requirement information of a subnet that forms the network slice, wherein the requirement information of the subnet is for managing the subnet, and wherein the network slice comprises at least one subnet; and
send a second management request to a second management entity via the communications interface, wherein the second management request carries the requirement information of the subnet and instructs the second management entity to manage the subnet based on the requirement information of the subnet.

8. The first management entity according to claim 7, wherein the at least one processor is further configured to cause the first management entity to allocate a network slice identifier to the network slice.

9. The first management entity according to claim 7, wherein the at least one processor is further configured to cause the first management entity to receive, via the communications interface, an identifier of the subnet from the second management entity.

10. The first management entity according to claim 9, wherein the at least one processor is further configured to cause the first management entity to associate the identifier of the subnet with a network slice identifier.

11. The first management entity according to claim 7, wherein managing the subnet comprises creating, selecting, configuring, or activating the subnet.

12. The first management entity according to claim 7, wherein the requirement information of the network slice comprises at least one of a type of the network slice, Service Level Agreement (SLA) information of the network slice, deployment information of the network slice, a key performance indicator (KPI) of the network slice, a network characteristic of the network slice, user information of the network slice, or information about a service provided by the network slice.

13. The first management entity according to claim 7, wherein the requirement information of the subnet comprises at least one of a type of the subnet, Service Level Agreement (SLA) information of the subnet, deployment information of the subnet, a key performance indicator (KPI) of the subnet, or a functional characteristic of the subnet.

14. A network slice management system, comprising:
a first management configured to:
receive a first management request, wherein the first management request carries requirement information of a network slice and instructs the first management entity to manage the network slice based on the requirement information of the network slice; and
determine requirement information of a subnet that forms the network slice, wherein the requirement information of the subnet is for managing the subnet, and wherein the network slice comprises at least one subnet; and
a second management entity communicatively coupled to the first management entity and configured to receive a second management request from the first management entity, wherein the second management request carries the requirement information of the subnet and instructs the second management entity to manage the subnet based on the requirement information of the subnet.

15. The network slice management system according to claim 14, wherein the first management entity is further configured to allocate a network slice identifier to the network slice.

16. The network slice management system according to claim 15, wherein the first management entity is further configured to associate an identifier of the subnet with the network slice identifier.

17. The network slice management system according to claim 14, wherein managing the subnet comprises creating, selecting, configuring, or activating the subnet.

18. The network slice management system according to claim 14, wherein the requirement information of the network slice comprises at least one of a type of the network slice, Service Level Agreement (SLA) information of the network slice, deployment information of the network slice, a key performance indicator (KPI) of the network slice, a network characteristic of the network slice, user information of the network slice, or information about a service provided by the network slice, and wherein the requirement information of the subnet comprises at least one of a type of the subnet, SLA information of the subnet, deployment information of the subnet, a KPI of the subnet, or a functional characteristic of the subnet.

* * * * *